May 3, 1927.

C. A. PETERS 1,627,252

LAWN MOWER

Filed June 7, 1924    4 Sheets-Sheet 1

INVENTOR:
C. A. PETERS.
By Whiteley and Ruckman
ATTORNEYS.

May 3, 1927.
C. A. PETERS
1,627,252
LAWN MOWER
Filed June 7, 1924
4 Sheets-Sheet 2
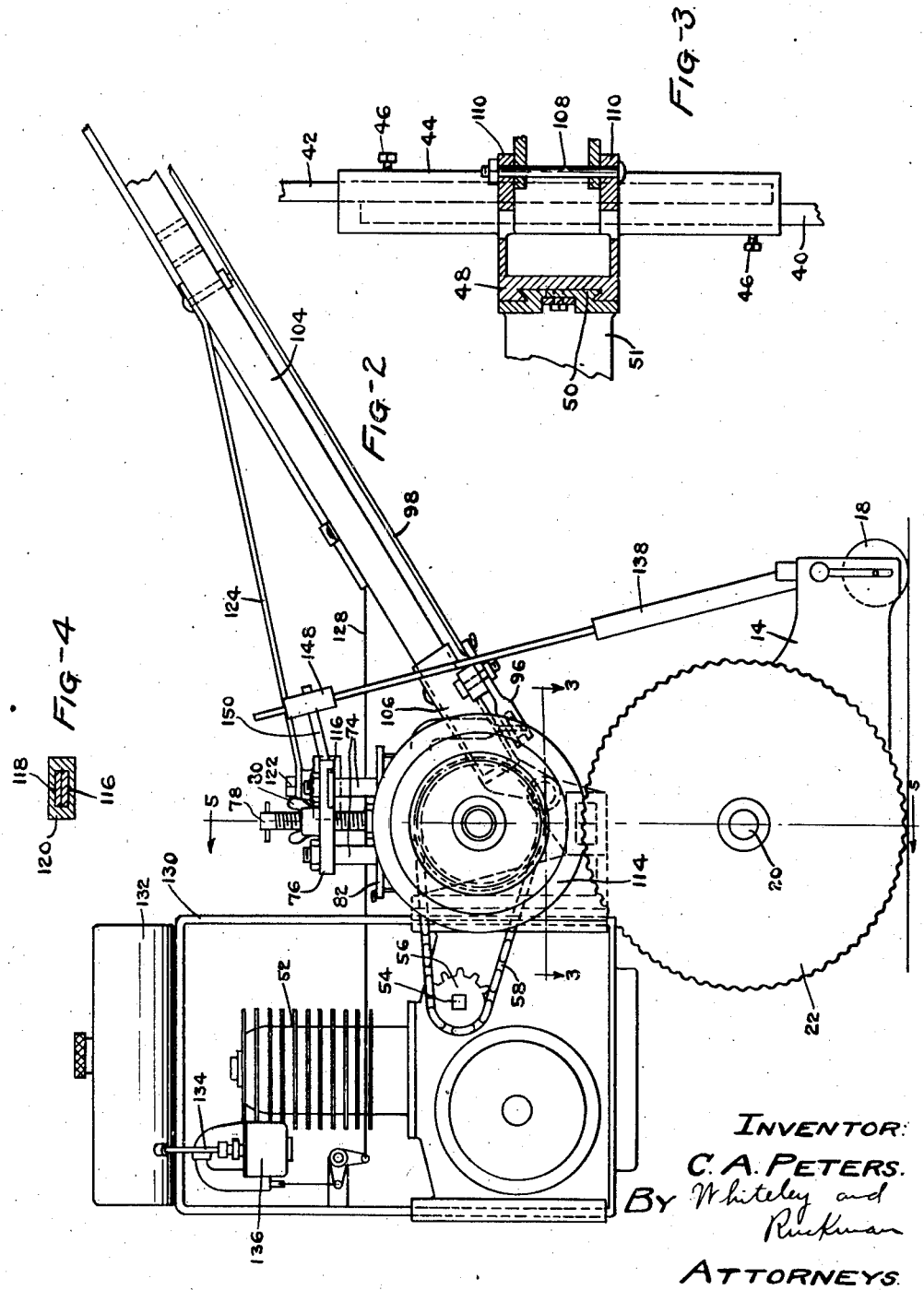
INVENTOR:
C. A. PETERS.
By Whiteley and
Ruckman
ATTORNEYS.

May 3, 1927.

C. A. PETERS

LAWN MOWER

Filed June 7, 1924　　4 Sheets-Sheet 3

1,627,252

INVENTOR
C. A. PETERS.
BY Whiteley and Ruckman
ATTORNEYS

May 3, 1927.  
C. A. PETERS  
1,627,252  
LAWN MOWER  
Filed June 7, 1924  4 Sheets-Sheet 4
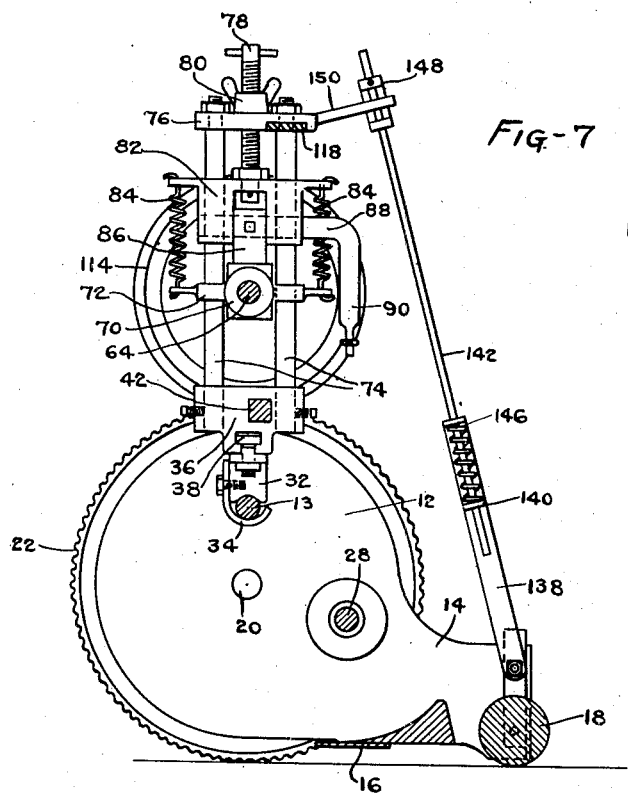
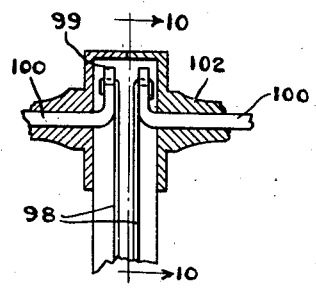
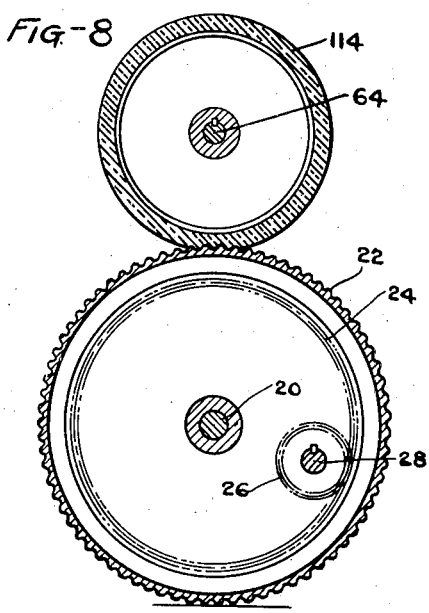
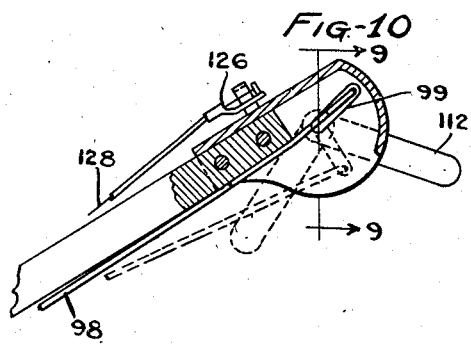
INVENTOR:  
C. A. PETERS.  
BY Whiteley and Ruckman  
ATTORNEYS.

Patented May 3, 1927.

1,627,252

UNITED STATES PATENT OFFICE.

CORNELIUS A. PETERS, OF MINNEAPOLIS, MINNESOTA.

LAWN MOWER.

Application filed June 7, 1924. Serial No. 718,490.

My invention relates to lawn mowers and an object is to provide a machine of this character which is operated by a motor having connections with two traction or ground wheels, the arrangement being such that either or both of these wheels can be quickly disengaged from and engaged with the driving connections. Another object is to provide operating mechanism which is adjustably constructed in such manner that it can be readily applied to lawn mowers having different distances between the traction wheels and having different sized traction wheels. Another object is to provide a construction which permits the motor, which is preferably an internal combustion engine to be attached to and detached from a support carried by the machine. Other objects are to provide a power-driven lawn mower which is easy and economical to manufacture, efficient in operation and of sufficiently light weight so that it can be readily steered and manipulated by the operator who walks at the rear.

The full objects and advantages of my invention will appear in connection with the detailed description thereof, and the novel features embodied in my inventive idea will be particularly pointed out in the claim.

In the accompanying drawings, which illustrate the practical embodiment of my invention,—

Figure 1:
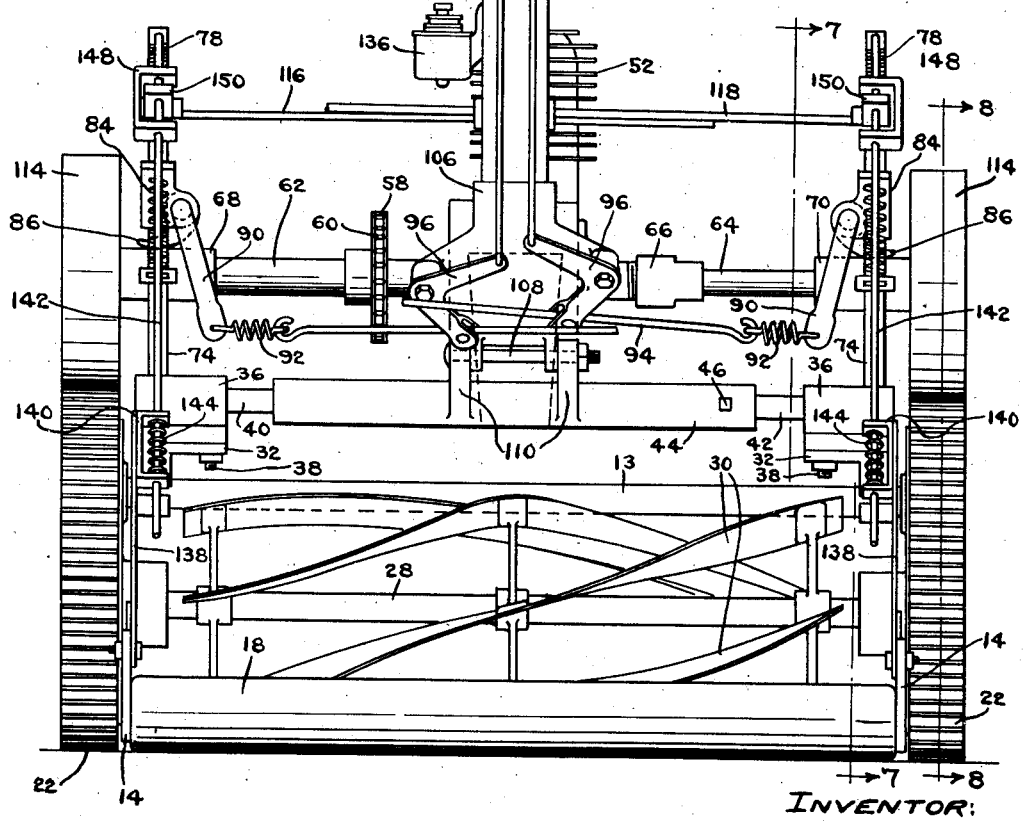
Figure 5:
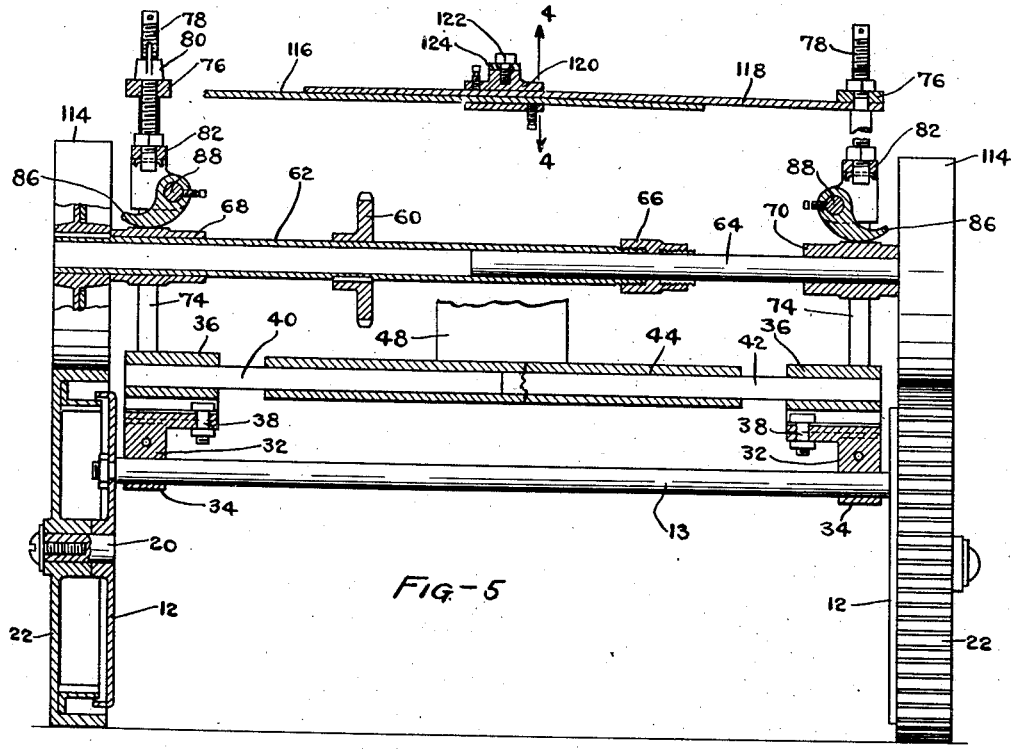
Figure 6:
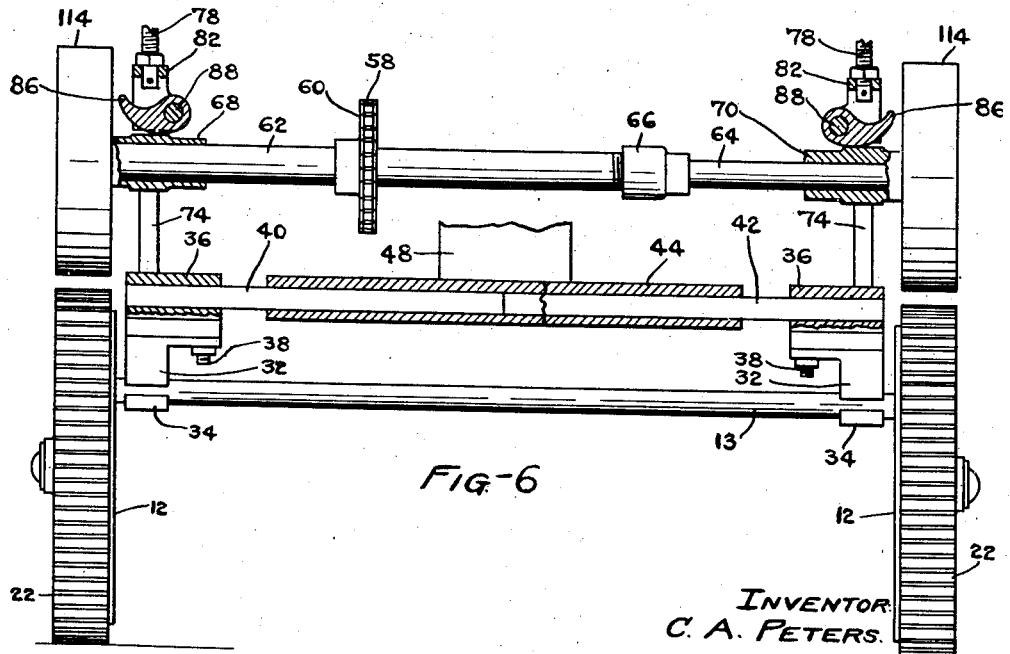

Fig. 1 is a rear elevational view of the machine. Fig. 2 is a side elevational view thereof. Fig. 3 is a view in horizontal section on the line 3—3 of Fig. 2. Fig. 4 is a view in vertical section on the lines 4—4 of Fig. 5. Fig. 5 is a view in vertical section on the line 5—5 of Fig. 2. Fig. 6 is a view similar to Fig. 5 but showing some of the parts in different position. Fig. 7 is a view in vertical section on the line 7—7 of Fig. 1. Fig. 8 is a view in vertical section on the line 8—8 of Fig. 1. Fig. 9 is a detail view in section on the line 9—9 of Fig. 10. Fig. 10 is a detail view in section on the line 10—10 of Fig. 9.

Referring to the construction shown in the drawings, the main frame of the machine includes a pair of discs 12 connected by a crossbar 13 and having rearwardly-extending arms 14 which carry a fixed cutter bar 16 and a roller 18 for engaging with the ground as is customary. Extending outwardly from the discs 12 are stub shafts 20 upon which traction wheels 22 are rotatably mounted. Secured within the corrugated rims of the traction wheels are internal gears 24 with which mesh pinions 26 secured on the ends of a cutter shaft 28 carrying the rotary cutter blades 30. Angular supports 32 are adjustably secured to the crossbar 13 near the ends thereof by clips 34. Blocks 36 are adjustably secured to the supports 32 by bolts 38, the heads of which engage in undercut recesses in the blocks as shown in Figs. 5 and 7. The blocks 36 have square openings in which fit the outer ends of two square bars 40 and 42, whose inner ends extend past each other, as shown in Fig. 3, and are received in a sleeve member 44 in which they are adjustably held by set screws 46. The sleeve member 44 carries an extension 48 which contains a vertical dove-tailed recess which receives a corresponding projection 50 carried by a motor base 51, so that this base and the motor carried thereby may be readily removed. The motor consists of an internal combustion engine 52 having an engine shaft 54 to which is secured a sprocket wheel 56 connected by a sprocket chain 58 to a sprocket wheel 60 secured to a hollow shaft member 62 which telescopically receives a solid shaft member 64. The two shaft members just referred to are secured together in adjusted position by a locking nut 66 and it will be understood that upon properly adjusting this nut the shaft members may telescope more or less as desired. The outer ends of the shaft members 62 and 64 are mounted in similar bearings 68 and 70 carried by slides 72 mounted for sliding movement upon pairs of vertical rods 74 which extend up from the blocks 36. The upper ends of the rods 74 are connected by bars 76 through which bolts 78 are threaded and secured in adjusted position by wing nuts 80. The lower ends of the bolts 78 are attached to yoke-shaped members 82, the two branches of which have openings receiving the rods 74. The position of the members 82 on the rods may be adjusted by means of the bolts 78. The slides 72 are connected with ears on the members 82 by pairs of coiled springs 84 whereby the bearings 68 and 70 carried by these slides are held resiliently upward with the bearings 68 and 70 in engagement with cams 86.

The cams 86 are positioned between the branches of the members 82 and are secured to shafts 88 passing rotatably through these branches. The shafts 88 have crank arms 90 whose outer ends are connected by springs 92 with rods 94 adjustably secured to arms of bell-cranks 96, whose other arms are connected by rods 98 with crank-arms 99 on the inner ends of two shafts 100 mounted in the crossbar member 102 of a rearwardly-extending handle 104 whose forward end is secured in a socket member 106 secured by a bolt 108 to lugs 110 extending up from the sleeve member 44. It will be noted from Fig. 1 that the bell-cranks 96 are pivoted to ears extending out from the socket member 106. The outer ends of the shaft 100 are provided with hand cranks 112 by means of which the rods 98 will be pulled from the dotted-line position shown in Fig. 10 into the full-line position shown in this figure. When this is done the cams 86 are turned from the position shown in Fig. 6 into that shown in Fig. 5.

Secured to the outer ends of the shaft members 62 and 64 are friction wheels 114 provided with rubber rings for engagement with the corrugated peripheries of the traction wheels 22. When the cams 86 are turned into the position shown in Fig. 5, the friction wheels 114 are forced into engagement with the traction wheels 22 so that, as shown in Fig. 8, the rubber rings and the wheels have in effect interengaging teeth. At the same time the rubber will yield and permit slippage in case too great resistance to forward movement of the machine is encountered. The bars 76 are connected by two bars 116 and 118 whose inner ends overlap each other as shown in Figs. 4 and 5, and are adjustably secured in a sleeve 120 which is provided with a bolt 122 for securing the forward end of a brace rod 124 whose rear end is adjustably secured to the handle 104 as shown in Fig. 2. Mounted on the rear of the handle member is a lever 126 which is connected by a wire 128 with the engine for controlling the supply of gas thereto. A sheet metal angular support 130 connected with the base of the engine has an upper horizontal portion upon which is secured a fuel-oil tank 132 connected by a supply pipe 134 with the engine carburetor 136. As shown in Fig. 7, upwardly-extending bars 138 are secured to the arms 14 while secured to the upper ends of these bars are U-shaped pieces 140, the arms of which are provided with holes to slidably receive the lower ends of rods 142 which are surrounded by coiled springs 144 interposed between the lower arms of the members 140 and cotter-pins 146 passing through the rods 142. Secured to the upper ends of the rods 142 are U-shaped pieces 148 extending between the arms of which are bars 150 secured at their forward ends to the bars 76 and having openings in their rear ends through which the rods 142 pass.

The operation and advantages of my invention will be obvious in connection with the foregoing description. The lawn mower is propelled along the ground by the motor and is easily manipulated and steered by the operator who walks at the rear so that the crank handles 112 are within easy reach. An important feature of the invention consists in providing means under control of the operator whereby the friction wheels may be either simultaneously or independently engaged with and disengaged from the traction wheels in order that the machine may be quickly swerved in either direction to move around trees and shrubbery and in order that the machine may be quickly turned in either direction when the end of the plat of grass which is being cut is reached. When the operator pushes forwardly on one of the crank handles 112 the corresponding friction wheel 114 will be lifted from engagement with the traction wheel associated therewith and the machine will turn on this traction wheel as a center. It is evident that the machine can be turned in either direction to any desired extent and can be turned so as to start back in the opposite direction. It will be understood that in case both crank handles are pushed forwardly simultaneously the propulsion of the machine will be stopped without stopping the motor. When this latter condition exists the machine may be readily pulled backwardly by hand. It will be noted that the springs 84 contract and cause the friction wheels to be disengaged from the traction wheels when the cams 86 are in released condition. The employment of friction wheels for driving the cutter shaft permits slippage and avoids injury to the machine when the cutter blades strike stones or other obstructions. It will also be noted that a limited amount of up-and-down movement of the ground roller 18 is permitted on account of the U-members 148 having two arms adapted to engage the lower and upper sides of the bars 150. If the rear of the machine has a tendency to lift more than a limited amount this lifting action is resisted by the compression of the springs 144. It will be further noted that the shaft which carries the friction wheels is made in two telescoping parts, that the bars 40 and 42 are adjustably secured in the sleeve 42 and that the bars 116 and 118 are adjustably secured in sleeve 120. This construction provides for adjustment according to the distance between the two traction wheels. The adjusting screws 78 provide for adjustment according to the size of the traction wheels. The motor may be readily removed when desired on account of the motor base having a dove-tailed projection engaging in a recess in the member 48, as shown in Fig. 3.

I claim:

A lawn mower comprising a support, traction wheels upon which said support is mounted, a fixed cutter blade carried by said support, rotary cutter blades adapted to cooperate with said fixed blade, a transverse shaft to which said rotary blades are secured, driving connections between said traction wheels and said transverse shaft, slides mounted for vertical movement above said traction wheels, a transverse shaft mounted in bearings carried by said slides, friction wheels secured to said shaft adjacent said bearings, springs tending to move said slides upwardly to bring said friction wheels out of engagement with said traction wheels, cams engaging the upper sides of said slides for moving said friction wheels into engagement with said traction wheels, means under control of the operator for operating said cams, a motor carried by said support, and means for driving said second transverse shaft from said motor.

In testimony whereof I hereunto affix my signature.

CORNELIUS A. PETERS.